(12) United States Patent  
Safavi-Naini

(10) Patent No.: US 8,495,596 B1  
(45) Date of Patent: Jul. 23, 2013

(54) SYSTEM, METHOD, AND COMPUTER PROGRAM FOR INTERFACING AN AUTOMATIC OPERATIONAL SUPPORT SYSTEM WITH A LEGACY OPERATIONAL SUPPORT SYSTEM

(75) Inventor: Mehdi Safavi-Naini, Toronto (CA)

(73) Assignee: Amdocs Software Systems Limited, Dublin (IE)

( * ) Notice: Subject to any disclaimer, the term of this patent is extended or adjusted under 35 U.S.C. 154(b) by 1075 days.

(21) Appl. No.: 12/368,203

(22) Filed: Feb. 9, 2009

(51) Int. Cl.  
*G06F 9/45* (2006.01)

(52) U.S. Cl.  
USPC .......................................................... 717/138

(58) Field of Classification Search  
None  
See application file for complete search history.

(56) References Cited

U.S. PATENT DOCUMENTS

| | | | |
|---|---|---|---|
| 6,085,255 A * | 7/2000 | Vincent et al. | 709/238 |
| 6,704,747 B1 * | 3/2004 | Fong | 1/1 |
| 8,141,031 B2 * | 3/2012 | Iborra et al. | 717/104 |
| 2003/0055921 A1 * | 3/2003 | Kulkarni et al. | 709/220 |
| 2003/0177047 A1 * | 9/2003 | Buckley | 705/7 |
| 2004/0100502 A1 * | 5/2004 | Ren | 345/802 |
| 2006/0010433 A1 | 1/2006 | Neil | 717/138 |
| 2006/0075102 A1 | 4/2006 | Cupit | 709/225 |
| 2006/0265410 A1 * | 11/2006 | Christianson et al. | 707/100 |
| 2006/0271535 A1 * | 11/2006 | Hammond et al. | 707/5 |
| 2006/0271830 A1 * | 11/2006 | Kwong et al. | 714/50 |
| 2008/0065453 A1 * | 3/2008 | Settuducati | 705/8 |
| 2008/0263174 A1 * | 10/2008 | Manson et al. | 709/217 |
| 2009/0100443 A1 * | 4/2009 | Bohle et al. | 719/320 |
| 2009/0144625 A1 * | 6/2009 | Muller et al. | 715/723 |
| 2009/0187407 A1 * | 7/2009 | Soble et al. | 704/260 |
| 2010/0185686 A1 * | 7/2010 | Weigert et al. | 707/803 |

\* cited by examiner

*Primary Examiner* — Wei Zhen  
*Assistant Examiner* — Adam R Banes  
(74) *Attorney, Agent, or Firm* — Zilka-Kotab, PC

(57) ABSTRACT

A system, method, and computer program product are provided for interfacing an automated operational support system (OSS) with a legacy OSS. In use, a legacy OSS that operates manually at least in part is automated, utilizing an adapter. Furthermore, an automatic OSS is interfaced with the legacy OSS based on the automation, utilizing the adapter.

15 Claims, 4 Drawing Sheets

SYSTEM, METHOD, AND COMPUTER PROGRAM FOR INTERFACING AN AUTOMATIC OPERATIONAL SUPPORT SYSTEM WITH A LEGACY OPERATIONAL SUPPORT SYSTEM

FIELD OF THE INVENTION

The present invention relates to operational support systems, and more particularly to automatic operational support systems.

BACKGROUND

Traditionally, operational support systems (OSSs) have supported operations of network systems. For example, the OSSs have generally supported operations of telecommunications service providers. Unfortunately, integration of modern OSSs with existing legacy OSSs implemented for network systems has conventionally been limited.

Just by way of example, legacy OSSs usually do not have open interfaces or offer proprietary interfaces based on old technologies. Some vendors may offer open interfaces over modern technologies, but such interfaces still offer a direct view into the old concepts of data and process utilized in legacy OSSs. For example, custom point solutions generally only fulfill isolated functions and are incapable of providing a full interface between all functionality of the modern OSSs and the legacy OSSs.

Further, legacy OSSs are conventionally designed for manual or semi-automatic operation, such that their models, data, processes and functions are designed to complement a human intensive operation. Modern OSSs, however, are generally designed for automatic operation, such that manual operation required by the legacy OSSs is not supported.

There is thus a need for addressing these and/or other issues associated with the prior art.

SUMMARY

A system, method, and computer program product are provided for interfacing an automated operational support system (OSS) with a legacy OSS. In use, the operation of a legacy OSS that operates manually at least in part is automated, utilizing an adapter. Furthermore, an automatic OSS is interfaced with the legacy OSS based on the automation, utilizing the adapter.

DETAILED DESCRIPTION

Figure 1:
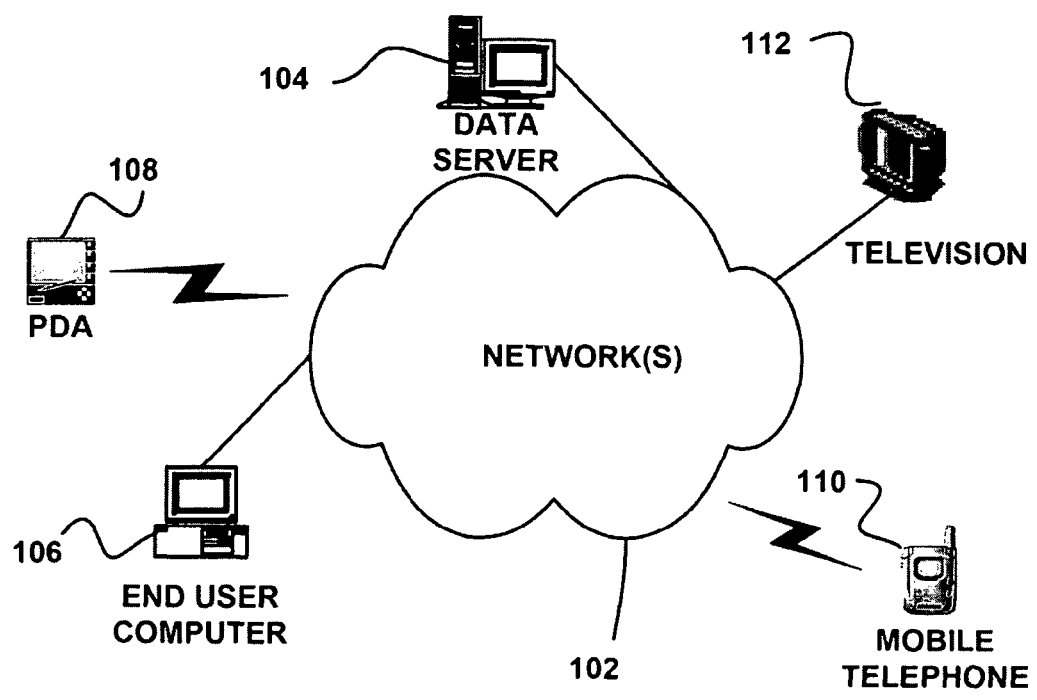
FIG. 1 illustrates a network architecture, in accordance with one possible embodiment.
Figure 1:

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided. Additionally parts of these networks may be under control of a legacy operational support system (OSS) while a modern OSS may be required to control the rest of the networks. The automatic operation of the modern OSS may require integration with and encapsulation of the manual or semi-manual legacy OSS in the end-to-end context of automatic OSS control of the networks.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
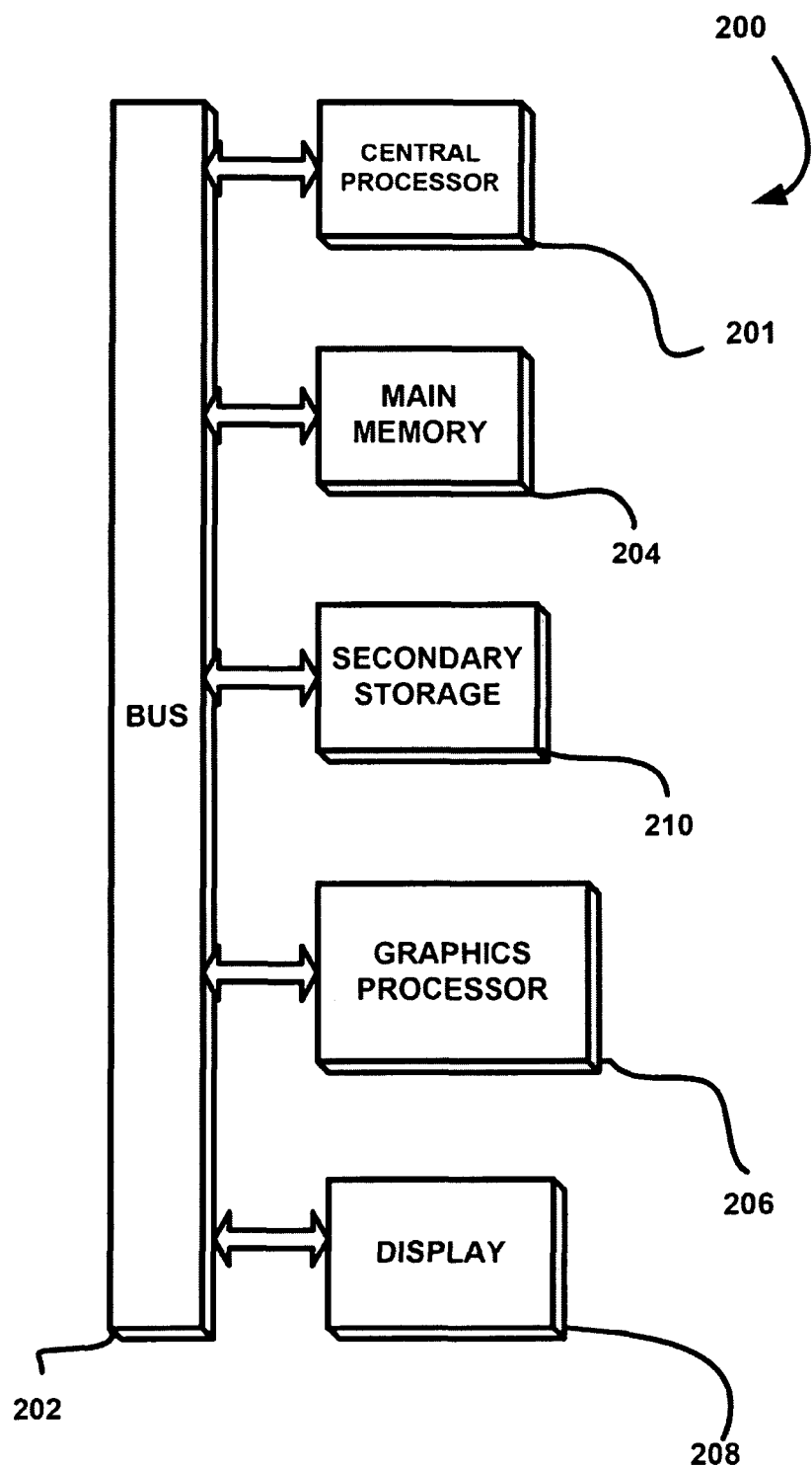
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a network drive/server and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
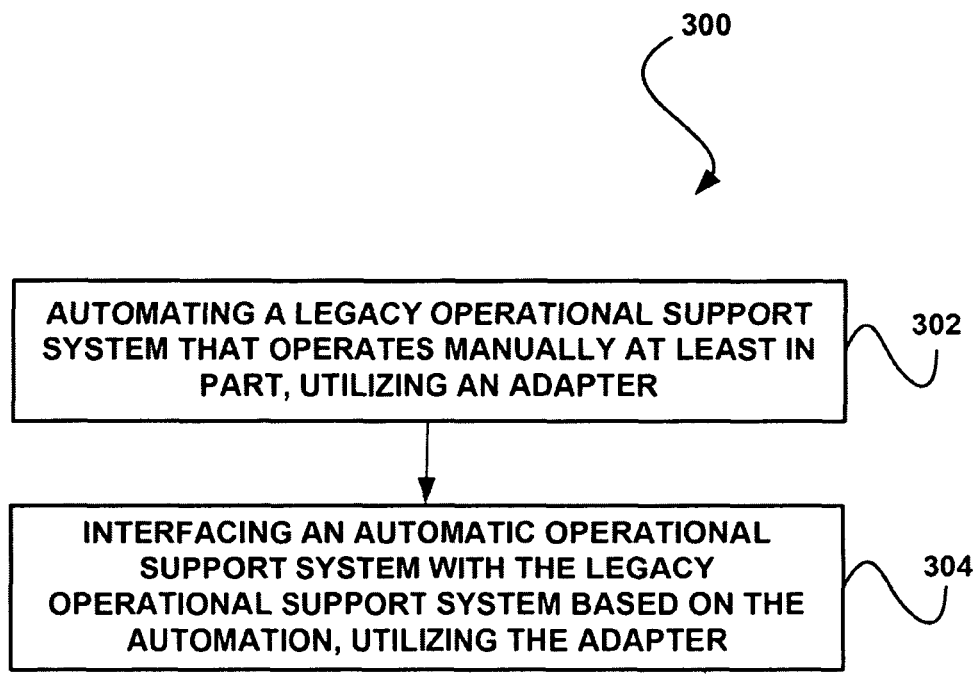
FIG. 3 illustrates a method for interfacing an automated operational support system with a legacy operational support system, in accordance with one embodiment.

FIG. 3 illustrates a method 300 for interfacing an automated operational support system with a legacy operational support system, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a legacy operational support system (OSS) that operates manually at least in part is automated, utilizing an adapter. With respect to the present description, an OSS may include any system that provides support for various operations. For example, the OSS may provide support for operations of a network system.

In one embodiment, the OSS may include a computer system used by a telecommunications service provider (TSP). For example, the OSS may support functions of the network system. Such functions may include resource management (e.g. inventory, asset management, workforce management, network planning an dimpmlementation, etc.), fulfillment (e.g. order processing, service delivery and management, business and technical workflow management, wholesale gateways, provisioning, activation, etc.), assurance (e.g.

trouble, fault, etc. management), etc. Optionally, the functions may require management of network and service level data and processes.

To this end, the legacy OSS may include any OSS that operates manually at least in part. As an option, the legacy OSS may operate manually at least in part by operating, at least in part, based on user input. For example, models, data, processes, and/or functions of the legacy OSS may be provided via user input. Thus, the legacy OSS may operate manually or semi-automatically.

Further, with respect to the present description, automating the legacy OSS may include automating at least the manual operations of the legacy OSS. In one embodiment, the legacy OSS may be automated by performing pattern recognition. For example, operational patterns of the legacy OSS may be recognized via the pattern recognition and automatically driven via pattern generation.

The pattern may be of a user interaction with the legacy OSS (e.g. user input, user actions, etc. received by the legacy OSS, etc. and the output patterns of the legacy system to the user such as text content, special positioning and marketing of the output, graphical output, and their positional; temporal and sequencing information, etc.), as an option. In this way, patterns of user interactions with the legacy OSS may optionally be detected by the adapter or defined by the user as part of adapter configuration and metadata. As another option, the pattern recognition may be performed utilizing heuristics or rules and grammars. The above mentioned technologies (heuristics, etc.) are not mutually exclusive and the adapter may use any combination thereof that it optimized to specific requirements.

In another embodiment, the legacy OSS may be automated by storing each pattern recognized via the performance of the pattern recognition. The adapter may apply automated or human aided self learning logic in which it recognizes new and unknown patterns in the operation of the legacy system and request additional rules and information to complete the required knowledge associated with the newly detected patterns. Each pattern may be stored in a translation table or other appropriate data or metadata models. The translation table may optionally translate the pattern into operations capable of being utilized by an automated (e.g. modern, updated, etc.) OSS, as described in more detail below.

In yet another embodiment, the legacy OSS may be automated by generating processor logic for automatically performing each of the stored patterns. For example, different processor logic may be generated for each of the stored patterns. The processor logic may include the translation of the pattern that is stored in the translation table described above, as an option. Other options may include but are not limited to, the application of rules, grammars and algorithms.

As an option, the translation may include performing a consistency check, automatic completion, automatic correction, etc. on inconsistent data associated with the legacy OSS to a form that is implementable by an automatic OSS. The inconsistent data may include data (e.g. patterns, etc.) at the legacy OSS that is inconsistent as a result of user input, for example. Thus, the translation (e.g. consistency check, automatic completion, automatic correction, etc.) may repair inconsistent user input received at the legacy OSS. Correction and auto-generation may also be applied to the legacy system output as many problems in the output of systems interacting with humans may be tolerated due to the inference power of human brain, even where such problems pose severe problems for automatic OSS system that need to interface with the legacy system.

To this end, user actions (e.g. performed by a user via a computing device) may be automatically simulated for automating the legacy OSS. For example, the user actions may be automatically simulated by retrieving processor logic from the translation table for a pattern. The retrieved processor logic may then be automatically executed to simulate the pattern.

In still yet another embodiment, the legacy OSS may be automated by detecting unknown patterns and logging the unknown patterns. The unknown patterns may include patterns of user actions that are incapable of being recognized via the pattern recognition, for example. Moreover, the unknown patterns may optionally be stored (e.g. in the translation table) for generating processor logic to automatically perform the stored unknown patterns.

In one embodiment, the legacy OSS may also be automated by logging a frequency of occurrence of each of the unknown patterns that is detected. In addition, the unknown patterns may be selectively stored for generating processor logic to automatically perform the stored unknown patterns. Just by way of example, for each of the unknown patterns, the unknown pattern may be stored only if the unknown patterns has occurred a predetermined number of times.

In yet another embodiment, the legacy OSS may be automated by modeling network patterns, equipment patterns, services patterns, design patterns, etc. of the legacy OSS. For example, the patterns recognized via pattern recognition and/or the detected unknown patterns may include the network patterns, equipment patterns, services patterns, design patterns, etc. As an option, the modeling may include modeling such patterns to be compatible with inconsistent user input. For example, the patterns may be modeled as a result of the generated processor logic (e.g. stored in the translation table in association with the recognized patterns and detected unknown patterns).

Additionally, the adapter utilized to automate the legacy OSS may include software, in one embodiment. Of course, it should be noted that the adapter may also include any hardware and/or combination of hardware and software. In one embodiment, the adapter may be separate from the legacy OSS, but may access the legacy OSS for providing automation thereof.

Still yet, as shown in operation 304, an automatic OSS is interfaced with the legacy OSS based on the automation, utilizing the adapter. Accordingly, the adapter may interface the automatic OSS and the legacy OSS. In this way, the interfacing may enable the automatic OSS to function in the legacy OSS. The adapter may use all necessary techniques to automatically operate a manual or semi-manual legacy system such as, but not limited to, reading screens designed for human eye, screen scraping, generating key strokes as expected from a human user and driving terminals and terminal emulators.

With respect to the present description, the automatic OSS may include any OSS that is fully automated. Thus, operations of the automatic OSS may not necessarily be dependent on user input. In one embodiment, the legacy OSS may optionally be equipped with systems and processes that use outdated technology and methodology, whereas the automated OSS may include a modern (e.g. new generation) OSS that uses up-to-date technology and methodology.

By automating the legacy OSS via the adapter, the automatic OSS may be integrated with and function in the legacy OSS. The integration may include integration of the resource management, fulfillment, and assurance or any other functions of the automatic OSS and the legacy OSS. For example, the automatic OSS, which may be incapable of manual operations, may utilize the processor logic which provides a translation for patterns in the legacy OSS. Thus, even if the patterns include user actions, the translation of such patterns to processor logic may allow the automatic OSS to utilize such processor logic and accordingly interface with the legacy OSS.

To this end, the adapter may bridge human oriented inaccurate natural language data associated with the legacy OSS with a consistent model accessible by the automatic OSS. For example, the adapter may simulate user interaction with the legacy OSS to fulfill tasks in an automated workflow of the automatic OSS. As another example, the adapter may allow any component of the automatic OSS to connect with any component of the legacy OSS.

In one exemplary embodiment, the interfacing between the legacy OSS and the automatic OSS may ensure that at an interface level, the automatic OSS can integrate with the legacy OSS in all cases. As noted above, the actions of a user at a computer terminal may be automatically simulated by the automatic OSS where the user actions are utilized by the legacy OSS. In addition, integration over data interchange interfaces may be allowed based on both modern technologies of the automatic OSS and old technologies of the legacy OSS. In another exemplary embodiment, the interfacing between the legacy OSS and the automatic OSS may ensure that a consistent interface based on modern technology is offered to the automatic OSS by encapsulating the legacy OSS behind a consistent interface, namely the adapter, which is conceptually familiar to automatic OSS.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
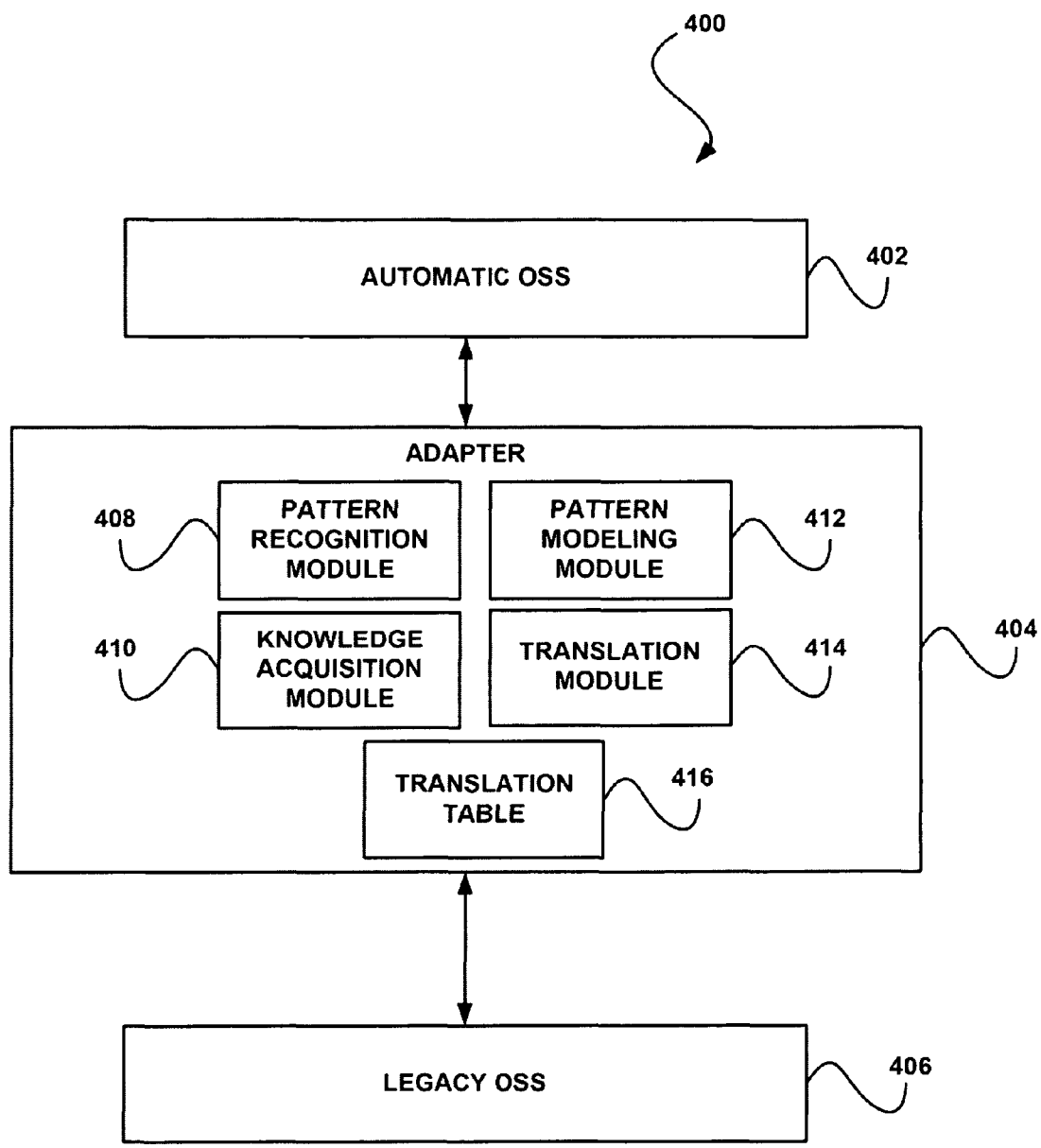
FIG. 4 illustrates a system for interfacing an automated operational support system with a legacy operational support system, in accordance with another embodiment.

FIG. 4 illustrates a system 400 for interfacing an automated operational support system with a legacy operational support system, in accordance with another embodiment. As an option, the system 400 may be implemented in the context of the details of FIGS. 1-3. Of course, however, the system 400 may be implemented in any desired environment. Again, the aforementioned definitions may equally apply to the description below.

As shown, an adapter 404 interfaces an automatic OSS 402 and a legacy OSS 406. Accordingly, the adapter 404 may include an interface to each of the automatic OSS 402 and a legacy OSS 406. In this way, the adapter 404 may allow the automatic OSS 402 to be integrated with any function in the legacy OSS 406.

With respect to the present embodiment, the automatic OSS 402 may be integrated with and function in the legacy OSS 406 for providing the automatic OSS 402 to a network system in which the legacy OSS 406 is implemented. For example, the network system may include a TSP. The network system may therefore utilize both the automatic OSS 402 and the legacy OSS 406 for receiving operational support therefrom.

As also shown, the adapter 404 includes a plurality of modules 408-414. As described below, the modules 408-414 may be utilized for automating the legacy OSS 406, such that the automatic OSS 402 may be integrated therewith. The modules may 408-414 may include computer code, hardware logic and/or any combination thereof.

The pattern recognition module 408 of the adapter 404 may be utilized for recognizing patterns of the legacy OSS 406. The patterns may include patterns of user input (e.g. user actions, etc.), for example. As another example, the patterns may include patterns of user behavior.

The pattern recognition module 408 may include policies for interaction with the legacy OSS 406 for performing pattern recognition to detect patterns. The pattern recognition may be performed utilizing heuristics. Further, the detected patterns may be translated into processor logic that is executed by specific custom processors.

To this end, pattern recognition as well as processor logic for recognized patterns may be designed (e.g. by translating the patterns) and added (e.g. stored) using a heuristic approach. In one embodiment, the processor logic may be stored in association with the patterns in a translation table 416. In this way, design and development of processor logic may be generated based on the specific and gradual expansion of use cases (e.g. recognizable patterns).

The knowledge acquisition module 410 of the adapter 404 may be utilized for detecting and logging unknown patterns of the legacy OSS 406. The knowledge acquisition module 410 may include a table driven learning logic to recognize and log the unknown patterns and acquire knowledge associated with such unknown patterns. Optionally, heuristics may be utilized for detecting the unknown patterns.

In one embodiment, the knowledge acquired by the knowledge acquisition module 410 may include a frequency of occurrence of each of the detected unknown patterns. For example, the frequency of occurrence may be logged for each of the detected unknown patterns. The unknown patterns may then be added to the translation table 416 in association with a translation thereof (e.g. based on the frequency of occurrence). As another option, the knowledge related to the unknown patterns may be selectively added to the translation table 416 as translation table entries, new patterns and associated processors.

The pattern modeling module 412 of the adapter 404 may provide a flexible intermediate object oriented model, process model or service model of the legacy OSS 406. For example, the pattern modeling module 412 may model network, equipment, services and design patterns compatible with inconsistent user input received at the legacy OSS 406.

For example, in one embodiment, equipment may be captured in a 12 level hierarchy consisting of 3 port and sub-port levels and 9 higher levels of structure with the 12th level representing the node level. The levels may hold their hierarchy and the same levels may create tree hierarchies. As another option, the equipment levels may be omitted and an internal structure may be missing for flexibility purposes of modeling user behavior. Still yet, equipment may be modeled as managed or unmanaged, and abstract or specific.

In another embodiment, locations may be associated with different equipment levels allowing for remote components. The locations may contain both administrative and topological content. In yet another embodiment, connections may be single unidirectional, bidirectional or double unidirectional.

In still yet another embodiment, services and connections may exist as designs and work orders. A work order (e.g. project) may include both design and project data. A design may include a linked sequence of design frames. Optionally, parallel design frames may be linked at the same sequential position.

The translation module 414 of the adapter 404 may translate recognized patterns and detected unknown patterns into processor logic for execution thereof by the automatic OSS 402. The translation performed by the translation module 414 may utilize consistency check, auto completion and auto correction to repair inconsistent data associated with the recognized patterns and detected unknown patterns. In this way, the translation may provide processor logic that is executable by the automatic OSS 402.

For example, the intermediate object oriented model of data and processes retrieved by the adapter 404 from the legacy OSS 406 may capture inconsistent user oriented data. The inconsistency may then be repaired by the translation module 414 utilizing corrections and insertions (e.g. auto-correction and auto-completion). The flexible linked list of design frames and the association of location with various levels may optionally allow for effective and efficient repair and refinement of the content and their transformation into a consistent automatic OSS 402 model.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for automating manual operations of a legacy operational support system that operates manually at least in part, utilizing an adapter, by the adapter:
      performing pattern recognition including utilizing at least one rule to recognize patterns of user actions with the legacy operational support system,
      detecting at least one unknown pattern of user actions with the legacy operational support system not recognized by the pattern recognition,
      for each of the at least one detected unknown pattern, requesting another rule to the at least one rule to add to information associated with the at least one detected unknown pattern,
      adding the recognized patterns and the at least one detected unknown pattern as entries to a translation table, wherein the at least one detected unknown pattern is added to the translation table based on a frequency of occurrence of the at least one unknown pattern in the legacy operational support system,
      translating the recognized patterns and the at least one detected unknown pattern added to the translation table into operations capable of utilization by an automatic operational support system, and
      storing the operations in the translation table; and
   computer code for interfacing the automatic operational support system with the legacy operational support system based on the automation, utilizing the adapter, including executing for the legacy operational support system the operations in the translation table by the automatic operational support system;
   wherein the computer program product is operable such that the automation of the manual operations of the legacy operational support system utilizing the adapter includes the adapter reading a screen designed for human eyes of the legacy operational support system, and subsequently generating keystrokes to the legacy operational support system by executing a portion of the operations in the translation table;
   wherein the computer program product is operable such that the adapter retrieves an intermediate object oriented model of the legacy operational support system from the legacy operational support system, and the intermediate object oriented model captures inconsistent user oriented data which is then repaired utilizing a linked list of design frames.

2. The computer program product of claim 1, wherein the adapter includes software.

3. The computer program product of claim 1, wherein automating the legacy operational support system comprises:
   automatically simulating user actions.

4. The computer program product of claim 1, wherein the pattern recognition is performed utilizing heuristics.

5. The computer program product of claim 1, wherein automating the legacy operational support system further comprises:
   logging the at least one detected unknown pattern.

6. The computer program product of claim 5, wherein automating the legacy operational support system further comprises:
   logging the frequency of occurrence of each of the at least one detected unknown pattern.

7. The computer program product of claim 1, wherein automating the legacy operational support system comprises:
   modeling at least one of network patterns, equipment patterns, services patterns, and design patterns.

8. The computer program product of claim 7, wherein the at least one of network patterns, equipment patterns, services patterns, and design patterns is modeled to be compatible with inconsistent user input.

9. The computer program product of claim 1, wherein translating the recognized patterns and the at least one detected unknown pattern added to the translation table includes performing at least one of a consistency check, automatic completion, and automatic correction to a form that is implementable by the automatic operational support system.

10. The computer program product of claim 9, wherein the consistency check, automatic completion, and automatic correction each repair inconsistent user actions received at the legacy operational support system.

11. The computer program product of claim 1, wherein interfacing the automatic operational support system with the legacy operational support system includes enabling the automatic operational support system to function in the legacy operational support system.

12. A method, comprising:
   automating manual operations of a legacy operational support system that operates manually at least in part, utilizing an adapter, by the adapter:
      performing pattern recognition including utilizing at least one rule to recognize patterns of user actions with the legacy operational support system,
      detecting at least one unknown pattern of user actions with the legacy operational support system not recognized by the pattern recognition,
      for each of the at least one detected unknown pattern, requesting another rule to the at least one rule to add to information associated with the at least one detected unknown pattern,
      adding the recognized patterns and the at least one detected unknown pattern as entries to a translation table, wherein the at least one detected unknown pattern is added to the translation table based on a frequency of occurrence of the at least one unknown pattern in the legacy operational support system,
      translating the recognized patterns and the at least one detected unknown pattern added to the translation table into operations capable of utilization by an automatic operational support system, and
      storing the operations in the translation table; and interfacing the automatic operational support system with the legacy operational support system based on the automation, utilizing the adapter, including executing for the legacy operational support system the operations in the translation table by the automatic operational support system;

wherein the automation of the manual operations of the legacy operational support system utilizing the adapter includes the adapter reading a screen designed for human eyes of the legacy operational support system, and subsequently generating keystrokes to the legacy operational support system by executing a portion of the operations in the translation table;

wherein the adapter retrieves an intermediate object oriented model of the legacy operational support system from the legacy operational support system, and the intermediate object oriented model captures inconsistent user oriented data which is then repaired utilizing a linked list of design frames.

13. A system, comprising:

a processor for:

automating manual operations of a legacy operational support system that operates manually at least in part, utilizing an adapter, by the adapter:

performing pattern recognition including utilizing at least one rule to recognize patterns of user actions with the legacy operational support system, detecting at least one unknown pattern of user actions with the legacy operational support system not recognized by the pattern recognition, for each of the at least one detected unknown pattern, requesting another rule to the at least one rule to add to information associated with the at least one detected unknown pattern, adding the recognized patterns and the at least one detected unknown pattern as entries to a translation table, wherein the at least one detected unknown pattern is added to the translation table based on a frequency of occurrence of the at least one unknown pattern in the legacy operational support system, translating the recognized patterns and the at least one detected unknown pattern added to the translation table into operations capable of utilization by an automatic operational support system, and storing the operations in the translation table; and interfacing the automatic operational support system with the legacy operational support system based on the automation, utilizing the adapter, including executing for the legacy operational support system the operations in the translation table by the automatic operational support system;

wherein the system is operable such that the automation of the manual operations of the legacy operational support system utilizing the adapter includes the adapter reading a screen designed for human eyes of the legacy operational support system, and subsequently generating keystrokes to the legacy operational support system by executing a portion of the operations in the translation table;

wherein the system is operable such that the adapter retrieves an intermediate object oriented model of the legacy operational support system from the legacy operational support system, and the intermediate object oriented model captures inconsistent user oriented data which is then repaired utilizing a linked list of design frames.

14. The system of claim 13, wherein the processor is coupled to memory via a bus.

15. The computer program product of claim 7, wherein the each of the at least one of the network patterns, the equipment patterns, the services patterns, and the design patterns are compatible with inconsistent user input received at the legacy operational support system.

\* \* \* \* \*